Sept. 29, 1936. A. RAFTER 2,055,803
POWER TRANSMISSION DEVICE
Filed July 24, 1935 2 Sheets-Sheet 2
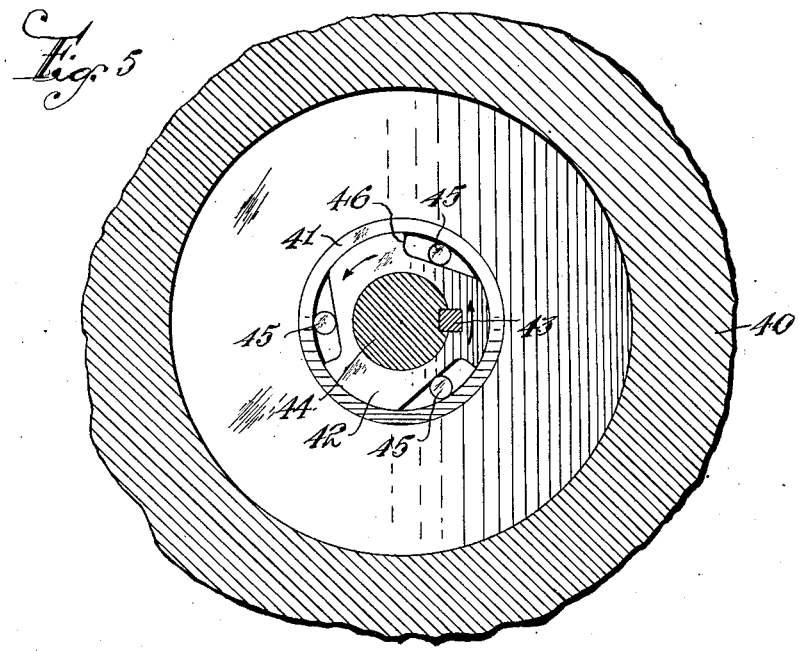
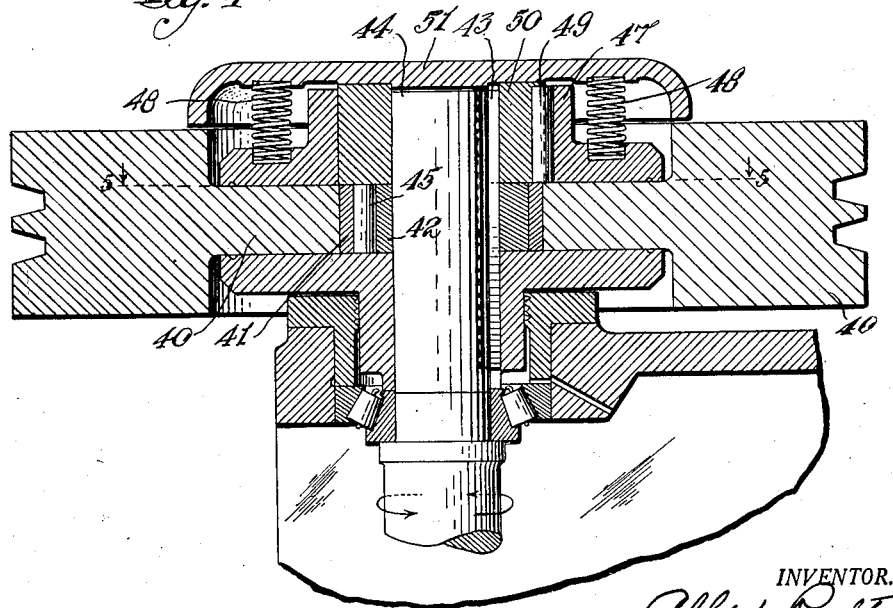
INVENTOR.
Albert Rafter.
BY Fredk C Fischer
ATTORNEYS.

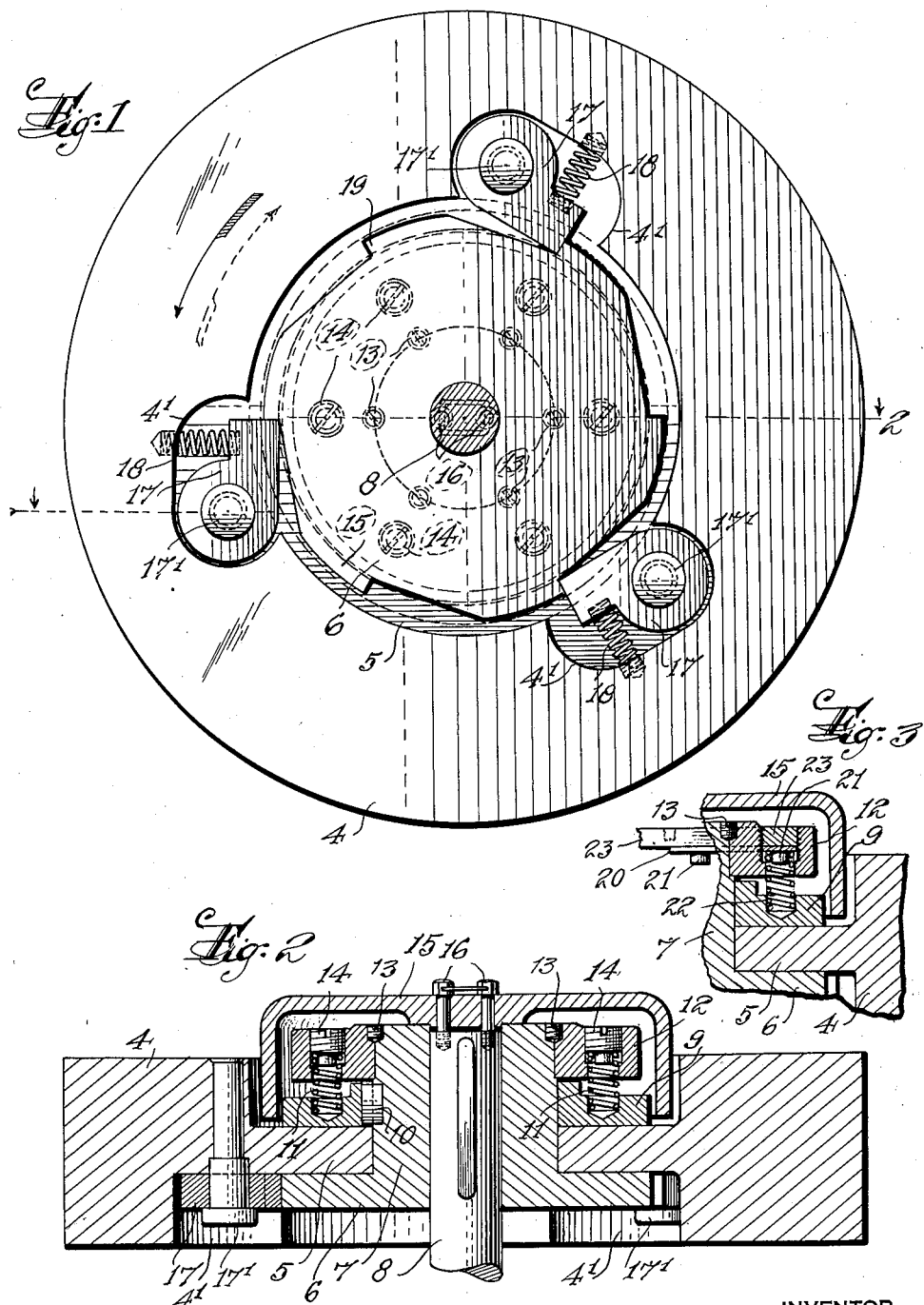

Patented Sept. 29, 1936

2,055,803

UNITED STATES PATENT OFFICE 2,055,803

POWER TRANSMISSION DEVICE

Albert Rafter, Glen Ridge, N. J., assignor to Rafter Machine Company, Belleville, N. J., a partnership composed of Albert Rafter and John C. Rafter, Jr.

Application July 24, 1935, Serial No. 32,873

5 Claims. (Cl. 192—48)

This invention relates to a power transmitting device and more particularly to a friction clutching device which becomes ineffective for power transmitting purposes when the forces applied thereto exceed a predetermined amount.

In machines where large forces are applied, it often happens that in some instances an excessive force is applied, which damages certain parts of the machine, or causes the power transmitting parts to jam, and it is often necessary to completely dismantle the machine to restore it to its proper running order. In some machines, the repairing of such defects requires considerable time and labor and is obviously expensive.

It is an object of this invention to provide a power-transmitting device in which the power is transmitted by friction means, said device also being provided with means to enable it to be effectively driven in an opposite direction to release the machine from a jamming condition caused by an overload.

A further object is the provision, in a friction power transmitting device, of means for adjusting the amount of friction to enable the machine to accommodate predetermined loads.

These and other advantageous objects, which will later appear, are accomplished by the simple and practical construction and arrangement of parts hereinafter described and exhibited in the accompanying drawings, forming part hereof, and in which:

Fig. 1 is an elevational view of the power transmitting device,

Fig. 2 is a sectional view taken on line 2—2 of Fig. 1,

Fig. 3 is a sectional view showing a modified form of adjusting means which can be used in the device, Fig. 4 is a sectional view of a modified form of the power transmitting device, and Fig. 5 is a view taken on line 5—5 of Fig. 4.

Referring to the drawings, the device is shown to comprise a driving wheel 4 which is provided with an internal flange 5 frictionally engaging the flange 6 of a hub 7 which is keyed to the shaft 8.

The wheel 4 can be driven by a belt, gears, or any other well-known driving medium.

A disc 9 is attached to the hub 7 by a spline 10 and is caused to exert a pressure upon the flange 5 by a plurality of compression springs 11 which are positioned in recesses in the disc 9, and in recesses in a plate 12 which is secured to the hub 7 by means of a plurality of screws 13 or other suitable means. Threaded into the recesses in the plate 12 and abutting the springs 11 are screws 14 by means of which the tension or compression of the springs and the forces exerted thereby can be adjusted.

The springs and the adjusting elements are confined within a casing 15 which is secured to the shaft 8 and rotates therewith by means of bolts 16.

Referring to Fig. 1, it will be seen that the wheel 4 is provided with a plurality of recesses 4' in each of which is pivotally mounted a pawl 17 on a suitable stud 17' normally urged outwardly from the recesses by a compression spring 18 carried by the wheel 4. The flange 6 has its periphery provided with a plurality of ratchet teeth 19 which are arranged to engage the pawls 17 when the wheel is rotated in one direction, the pawls ratcheting over the teeth when the wheel is rotated in the opposite direction.

In operation, when power is applied to cause the wheel 4 to rotate in a counter-clockwise direction, indicated by the arrow (see Fig. 1) the flange 5 on the wheel 4 frictionally engages the flange 6 to drive the latter, which in turn, through the hub 7, drives the shaft 8. When it is desired that the capacity of the power transmitting device be decreased, or increased, the screws 14 are moved either out or in with respect to the recesses in plate 12 to vary the pressure of the springs 11 on the disc 9, which in turn varies the pressure, that is, the frictional engagement between flanges 5 and 6.

Should the machine become overloaded, the frictional engagement between flanges 5 and 6 will be broken and they will not move together, that is, they will slip, causing the pawls 17 to ratchet over the teeth 19 to make a noise, which will notify an attendant of the overload.

In many instances, an overload will cause parts of a machine to become jammed or damaged; and this situation usually can be remedied only by completely dismantling the machine.

However, with my device, in the event that certain parts of the machine have become jammed because of an overload, it is only necessary to reverse the direction of rotation of the wheel 4 to cause it to rotate in a clockwise direction (see Fig. 1) so that the pawls 17 will engage the teeth 19 and drive the flange 6 and also the shaft 8 in an opposite direction to their normal directions of rotation, which will release the machine from the jammed condition.

In Fig. 3 is shown a modified form of adjusting means in which a ring 20 is provided with a plurality of bosses 21 receiving compression springs 22. The plate 12 is provided with an annular threaded slot which receives a threaded ring 23, the latter bearing against the ring 20. When it is desired to adjust the tension of the springs 22, the ring 23 is screwed into or out of the slot in the plate 12.

From the above description it will be seen that I have provided a comparatively simple and effective power transmitting device which can be readily adjusted to accommodate predetermined loads, and which slips and avoids damage to the machine upon which it is used when an overload is applied. The device is also provided with the pawls 17 and teeth 19 to enable driving in a reverse direction when it is desired to release the machine from a jam caused by an overload.

In Figs. 4 and 5 is shown a modified form of the invention in which a driving wheel 40 has attached thereto an annulus 41 which comprises an element of a one-way gripping device having a member 42 attached by means of a key 43 to the shaft 44. The member 42 has cut out portions 46 along the periphery thereof in which are positioned rollers 45. It will be seen, from Fig. 5, that when the annulus 41 is rotated clockwise, it will have a wedging action upon the rollers 45, to cause the rollers to tightly grip the member 42 so that the latter will rotate with the member 41 and transmit power to the shaft 44.

Keyed to the shaft 44 is a collar 50 which has attached thereto by means of a key 49, a friction disk 47, which is provided with recesses to receive compression springs 48 supported by the cover plate 51. The springs 48 force the friction plate 47 into tight frictional engagement with the wheel 40 to cause the wheel and disk 47 to rotate together.

When power is applied to cause the wheel 40 to rotate in a counterclockwise direction, the wheel transmits the power through the friction disk 47 and collar 50 to the shaft 44. When the machine becomes overloaded, frictional engagement between the wheel 40 and the disk 47 will be broken; that is, they will slip relative to each other and the shaft 44 will cease to be driven. If the parts of the machine have become jammed or damaged, the wheel 40 can be rotated in a clockwise direction and power will be transmitted to the shaft 44 through the one-way gripping device comprising the annulus 41, rollers 45 and member 42. This reversal of direction of rotation of the shaft 44 will release the machine from the jammed condition.

The foregoing disclosure is to be regarded as descriptive and illustrative only, and not as restrictive or limitative of the invention of which obviously an embodiment may be constructed including many modifications, without departing from the general scope herein indicated and denoted in the appended claims.

Having thus described my invention, what I claim as new and desire to secure by Letters Patent, is:

1. A power transmitting device comprising a driving wheel having a flange, a driven shaft, a hub keyed to the shaft and having a flange engaging the flange on the driving wheel, a disc splined to said hub, said disc bearing against the flange on the driving wheel, a plate attached to the hub, a plurality of compression springs supported by said plate and by the disc, said springs exerting pressure upon the disc to cause the flange on the driving wheel to frictionally engage the flange on the hub, means to adjust the springs to regulate the pressure exerted thereby, and a one-way gripping device associated with said wheel and hub to enable power to be transmitted from the wheel to the hub in one direction of rotation only.

2. A power transmitting device comprising a driving wheel, having a flange, a driven shaft, a hub keyed to the shaft and having a flange engaging the flange on the driving wheel, a disc splined to said hub, said disc bearing against the flange on the driving wheel, a plate attached to the hub, a plurality of compression springs supported by said plate and by the disc, said springs exerting pressure upon the disc to cause the flange on the driving wheel to frictionally engage the flange on the hub, and means to adjust the springs to regulate the pressure exerted thereby, said flange on the hub having a plurality of ratchet teeth about its periphery, a plurality of pawls pivotally supported by the driving wheel, and means to urge the pawls to engage said ratchet teeth when the driving wheel is rotated in a predetermined direction.

3. In a power transmitting device, a driving wheel, a driven shaft, a hub attached to said shaft and having a flange frictionally engaging parts of the driving wheel, said flange having a plurality of ratchet teeth about its periphery, a plurality of pawls pivotally supported by the driving wheel, and means carried by the driving wheel to urge the pawls into engagement with said ratchet teeth when the driving wheel is rotated in a certain direction.

4. In a power transmitting device, a driving wheel having a flange, a driven shaft, a hub attached to said shaft and having a flange frictionally engaging the flange on the driving wheel, and spring means carried by the hub to exert pressure upon the flange of the driving wheel, a plate supported by the hub and having an annular threaded slot, and a ring threaded into the slot, said ring adapted to engage the spring means to regulate the pressure exerted thereby.

5. A power transmitting device comprising a driving wheel having a flange, a driven shaft, a hub keyed to the shaft and having a flange engaging the flange on the driving wheel, a disc encircling said shaft and slidably mounted, said disc bearing against the flange on the driving wheel, a plate mounted at one end of the shaft, a plurality of compression springs supported by said plate and by the disc, said springs exerting pressure upon the disc to cause the flange on the driving wheel to frictionally engage the flange on the hub, and a one-way gripping device associated with said wheel and shaft to enable power to be transmitted from the wheel to the shaft in one direction of rotation only.

ALBERT RAFTER.